3,561,969
LIGHT-SENSITIVE COLOR FORMING COMPOSI-
    TIONS OF 9,10-PHENANTHRENEQUINONE
Marion Burg, Wilmington, Del., assignor to E. I. du Pont
    de Nemours and Company, Wilmington, Del., a cor-
    poration of Delaware
No Drawing. Filed Oct. 17, 1967, Ser. No. 675,779
                    Int. Cl. G03c 1/52
U.S. Cl. 96—90                                   14 Claims

ABSTRACT OF THE DISCLOSURE

A photosensitive composition comprises a solution of the photosensitizer 9,10-phenanthrenequinone (which may be substituted by electronegative groups), a salt of any metal ion above hydrogen in the electromotive series, and a hydrogen donor such as diethylene glycol. The hydrogen donor has to be of the type which reacts only with photoactivated phenanthrenequinone, i.e., hydrogen donation must not occur in the absence of exposure to actinic radiation. Photosensitive elements are made by coating the compositions onto supports. Exposure to actinic radiation causes the formation of color in the composition.

---

In my copending application, Ser. No. 675,765, filed Oct. 17, 1967, there are disclosed details of various photosensitive elements made from the compositions of this application as well as dry processes of forming images by exposing the elements to actinic radiation to form colored images.

BACKGROUND OF THE INVENTION

L. Michaelis and S. Granick, J. Am. Chem. Soc. 70, 624 (1948) discussed the thermal formation from phenanthrenequinone sulfonate of a compound intermediate between the quinone and the hydroquinone. This intermediate, in the dissolved state, exists in equilibrium with two modifications, viz, the free paramagnetic semiquinone radical and its diamagnetic, quinhydrone-like dimerization product. They disclose the formation of an intensely emerald-green, diamagnetic calcium compound. D. Bijl, H. Kaine and A. C. Rose-Innes, Nature, 174, 830 (1954) discloses the formation of a green colored paramagnetic substance when the quinhydrone system from phenanthrene quinone is adsorbed on barium hydroxide. D. R. Eaton, Inorganic Chemistry, 3, 1268 (1964), studied the complexing of the o-semiquinone radical with ions of the Group II and Group III metals Mg, Ca, Sr, Ba, Zn, Cd, Al, Y, and La by electron spin resonance. K. Maruyama, Chem. Soc., of Japan, Bull, 37, 553 (1964), discusses the adsorption of metal ketyls of phenanthrenequinone in the visible region at different temperatures and reports that the diamagnetic dimer shows an absorption band at longer wave lengths than the paramagnetic monomer, the dimerization reaction being reversible with temperature and concentration. In these disclosures a reducing agent is always present of the type which is capable of thermal reaction, i.e., reaction in the absence of radiation. There is no disclosure of a hydrogen donor which can react only with irradiated phenanthrenequinone.

U.S. Pat. 2,504,593 issued Apr. 18, 1959, discloses a photoprinting material containing a cupric salt and an anthraquinone sulfonic acid wherein exposure to light causes reduction of the cupric salt. This is also a dry, thermally developable system and development times are relatively long.

SUMMARY OF THE INVENTION

The present invention relates to a photosensitive composition comprising (1) a photosensitizer selected from 9,10-phenanthrenequinone or 9,10-phenanthrenequinone substituted with one or more electronegative groups; (2) about 0.2 or more parts per one part of photosensitizer of a hydrogen donor compound capable of reducing said sensitizer only after its activation by actinic radiation; (3) for each part of photosensitizer about 0.2 or more parts of at least one salt of a metal above hydrogen in the electromotive (EMF) series [1], preferably a salt of a polyvalent metal, selected from (a) salts of weak acids, (b) lead salts of strong acids, and (c) salts of strong acids in combination with salts of weak acids where there is at least one equivalent of weak to strong acid or excess weak acid; and (4) a substantially nonaqueous solvent. In a preferred embodiment, wherein the composition is to be coated on a support, there is also present an organic polymeric, film-forming binder.

A variety of colors is attainable by suitable selection of the metal salt and the phenanthrenequinone compound.

DESCRIPTION OF THE PREFERRED EMBODIMENTS

In the broader embodiment of the invention, a liquid composition is prepared comprising 9,10-phenanthrenequinone, a hydrogen donor, and a metal salt such as zinc acetate. Ethanol is a convenient hydrogen donor since it also serves as the nonaqueous solvent. Such a composition is capable of undergoing a color change upon exposure to actinic radiation. A preferred embodiment also comprises a film-forming binder such as polyvinyl formal which can also serve as a hydrogen donor. This preferred composition may be coated on a support such as a polyethylene terephthalate film to form a useful radiation sensitive element.

Upon exposure to white light, the composition undergoes a color change even in the presence of air. When air is bubbled through the colored solution in the absence of light, the color is discharged but reforms during re-exposure. Color changes have been observed in compositions comprising ions of any metal tested so long as the metal is above hydrogen in the electromotive series, i.e., ions of metals from lead up to and including lithium. Metal ions having a positive charge of two or more are preferred since they form more stable colors than do the ions with a positive charge of one. The monovalent ones generally form a red color whereas the polyvalent ones most commonly form a blue-green color.

The preferred metal salts are those of weak acids. They do not contribute to conditions of inoperably low pH or to a premature thermal reaction at excessively high pH. Salts of strong acids may also be used but generally they must be accompanied by a salt of a weak acid to prevent

---

[1] The more common metals listed in this series going upwards from hydrogen, are: Pb, Sn, Ni, Co, Cd, Fe, Cr, Zn, Mn, Al, Mg, Na, Ca, Ba, Sr, K, Rb, and Li.

excessive acidity. Thus, addition of potassium acetate to an ethanolic solution of phenanthrenequinone and hydrated magnesium chloride results in the formation of a blue-green color during irradiation. In the absence of the acetate salt this color change normally does not occur. With some metal salts, e.g., hydrated zinc chloride, the color change occurs even in the absence of potassium acetate but by adding it the color formation is enhanced. This is particularly evident when the colored solution is air-bleached in the dark by air bubbles and then re-exposed to reform the color. Lead salts are unique in that even when the anion is that of a strong acid, e.g., $Pb(CF_3CHFCF_2SO_3)_2$, it forms an intense blue-green color.

The use of a metal salt of a weak acid in combination with the metal salt of a strong acid is a very convenient way to prevent excessive acidity and alkalinity. It is also a very convenient way to prepare, in situ, a less readily available metal salt of a weak acid from a more readily available metal salt of a strong acid. Potssium acetate is particularly useful because of its solubility in ethanol. It is recognized that other agents are available for these purposes but are less convenient. That the color formation does not arise from potassium acetate itself is evident in that a red color is produced where this salt is used alone whereas in combination with a polyvalent metal salt of a strong acid there is formed the same blue-green or green color which is produced by the related polyvalent metal salt of a weak acid. It is understood, of course, that metal salts which are strong oxidents or reductants should not be used, e.g., lead tetraacetate, sodium hydrosulfite, etc.

Salts which are relatively stable in the presence of the 9,10-phenanthrenequinone photosensitizer include all salts with the exception of those known to be strong oxidizing or reducing agents. A simple test can be used to eliminate salts which are not sufficiently stable to be useful according to this invention:

The optical density at the wave length of maximum absorption ($\lambda_{max.}$ about 410 m$\mu$) is determined for a saturated solution of 9,10-phenanthrenequinone in ethanol or acetone at 25° C. To this solution there is added the equivalent of 1 g. per liter of a metal salt and, after stirring occasionally for 30 minutes in the dark at 25° C., the optical density of the solution is again determined. Metal salts which are useful in this invention will cause less than 10% change in optical density of the 9,10-phenanthrenequinone solution at $\lambda_{max.}$.

Some of the metal oxides and hydroxides like magnesium oxide and hydroxide, calcium hydroxide, aluminum hydroxide and plumbous oxide may be used in place of the salt. These compounds do not undergo the premature thermal reaction of similar basic compounds like barium and strontium hydroxide. It is believed that their thermal stability is related to their very low solubility in the preferred solvent, ethanol, thereby preventing excessive alkalinity.

In some instances the anion of the metal salt, e.g., acetylacetonate, may be the hydrogen donor. In such cases no other hydrogen donor is needed. Also the acetylacetonates are very useful because of their solubility in organic solvents.

Ethanol is particularly useful as a hydrogen donor and as a solvent for the phenanthrenequinone and many metal salts. Although small amounts of water, about 5 to 10% by total weight of the solvent, can be tolerated, excessive amounts are to be avoided. Suitable hydrogen donors may be selected by a simple test which is similar to the test used for selection of the salts. The optical density at the wave length of maximum absorption ($\lambda_{max.}$ about 410 m$\mu$) is determined for a saturated solution of 9,10-phenanthrequinone in ethanol or acetone at 25° C. To this solution there is added the equivalent of 100 grams per liter of a hydrogen donor and, after stirring occasionally for 30 minutes in the dark at 25° C., the optical density of the solution is again determined. Hydrogen donors which are useful in this invention will cause less than 10% decrease in optical density of the 9,10-phenanthrenequinone solution as maximum absorption. Where the nonaqueous solvent is a separate ingredient (not functioning as the hydrogen donor) any of the usual organic solvents are useful so long as they merely contribute solvent action. Obviously strongly acidic or strongly basic solvents should be avoided since (as discussed earlier) the photoinduced reaction will not occur if the composition has a very low pH (e.g. less than pH of 2) while too high a pH will lead to premature thermal reaction (in the absence of irradiation).

Other useful hydrogen donor compounds are the polyethylene glycols from mol wt. 106 to 6,000 and their ethers and esters, 2-propanol, benzyl alcohol, cyclohexanol, tetraethyl malondialdehyde, dioxane, toluene, the xylenes, and certain compounds which can also serve as film-forming binders, e.g. polyvinylformal, polyvinylbutyral, etc.

The photosensitizer must be 9,10-phenanthrenequinone or a derivative thereof containing one or more electronegative groups.

The colors produced are influenced by the valency of the metal ion, and also by the nature of the substituent on the phenanthrenequinone. The monovalent metal ions form a red color with phenanthrenequinone whereas the polyvalent ones generally form a green or blue-green color. A grey color can also be formed, e.g., with magnesium acetate and 4,5- or 2,7-dinitrophenanthrenequinone. Irradiation of an ethanolic slurry of calcium chloride and phenanthrenequinone produces a yellow-orange color.

Useful binders include alkyl esters of polyacrylic and polymethacrylic acid, e.g., polymethyl methacrylate, polyethyl methacrylate, and the corresponding acrylates; cellulose carboxylic acids, esters and ethers, e.g., cellulose acetate, cellulose acetate propionate, cellulose acetate butyrate, methyl, ethyl and benzyl cellulose; and polyvinyl alcohols, esters and acetals. Since the film-forming organic polymer binder is optional, its lower limit of concentration is zero while the upper limit can be about 95% of the total weight of the light-sensitive composition, exclusive of solvents.

A number of other materials may be present in the photosensitive composition such as coating aids, e.g., polyethylene oxides, sodium lauryl sulfate, etc., viscosity modifiers, fillers such as silica or cellulosics, pigments or dyes which transmit effectively in the actinic region of the spectrum, etc. The solvent which must be present in the composition is removed after coating if light-sensitive elements are prepared. Plasticizers are useful additives if the composition is used to prepare elements.

One example is given wherein the light-sensitive composition contains a polymerizable material. Useful compositions may contain any of the ethylenically unsaturated materials and/or any of the thermoplastic binders disclosed in Burg and Cohen, U.S. Pat. No. 3,060,023 in combination with the color-forming system of the present invention.

As disclosed earlier, the film-forming binder may be omitted. When a binder is used a preferred amount is about ten times the weight of the phenanthrenequinone. The concentration of the phenanthrenequinone and metal salt depends on the desired color density which in turn will be influenced, among other things, by the thickness of the irradiated mixture. This, of course, is dependent on the solubility of the ingredients. Since the phenanthrenequinones and many of the metal salts (except the acetylacetonates) are not very soluble in many organic solvents it is preferred to operate at their highest level of concentration thereby keeping solvent volume to a minimum. Excess of ingredients is not a problem and actually it is possible to photogenerate color by irradiation of a solid mixture of the quinone and metal salt merely moistened with ethanol. Theoretically desirable ratios of the phenanthrenequinone and the metal salt are based on the stoichiometry, i.e., one equivalent of the phenanthrenequinone compound for each equivalent weight of the metal salt. However, as indicated before, an excess of either ingredient is operable and this flexibility simplifies operations. A manifold excess of hydrogen donor can be present, especially when it also serves as solvent or a a binder.

The invention will be further illustrated by but is not intended to be limited to the following examples.

Example 1

To a solution of 9,10-phenanthrenequinone _____g__ 0.06
Ethanol _____ml__ 10 was added 0.20 g. of magnesium acetate tetrahydrate. The mixture was exposed at a distance of six inches for 3 seconds using a 500-watt tungsten filament lamp (General Electric Photoflood Lamp ASA No. PH/RFL 2). A blue-green color was formed. The color became more intense by irradiating for thirty seconds. After turning off the light, the solution was aerated by bubbling air through it. This treatment discharged the blue-green color and with re-exposure the aerated yellow solution turned a blue-green color argain. Repetition of the dark-aeration and exposure steps produced the same results. By replacing magnesium acetate tetrahydrate with the same amount of the following salts the following colors were formed during irradiation:

| Salt: | Color produced with irradiation |
|---|---|
| Cesium acetate | Red. |
| Cesium carbonate | Red. |
| Sodium carbonate | Red. |
| Sodium acetate | Red. |
| Potassium acetate | Red. |
| Magnesium acrylate | Blue-green. |
| Magnesium acetylacetonate | Do. |
| Calcium acetate hydrate | Do. |
| Calcium acrylate | Green. |
| Calcium acetylacetonate | Do. |
| Zinc acetate dihydrate | Blue-green. |
| Zinc acrylate | Do. |
| Zinc salicylaldehyde | Do. |
| Zinc acetylacetonate | Do. |
| Cadmium acetate dihydrate | Do. |
| Barium acetylacetonate | Do. |
| Aluminum acetylacetonate | Yellow-green. |
| Indium$^{+3}$ acetylacetonate | Grey. |
| Lanthanum acetate sesquihydrate | Green |
| Cerous acetylacetonate | Yellow-green. |
| Vanadium acetylacetonate | Blue-grey. |
| Manganous acetylacetonate | Blue-green changing to grey-green. |
| Manganic acetylacetonate | Green. |
| Nickelous acetate tetrahydrate | Blue-green. |
| Nickelous acetylacetonate | Do. |
| Cobaltous acetylacetonate | Green. |
| Zirconium acetylacetonate | Do. |
| Plumbous acetate trihydrate | Do. |

The formation of the colored species can be easily monitored. Using the Cary Spectrophotometer, Model No. 11, some of the characteristic spectral properties of irradiated ethanolic solutions were recorded and are given below.

| Salt | Color | Max., m$\mu$ |
|---|---|---|
| Cesium carbonate | Red | 518 (strong). |
| Magnesium acetate | Blue-green | 490–495 (weak), 645 (strong). |
| Indium acetylacetonate | Grey | Absorption throughout the visible with $D_{max}$ at 475 m$\mu$ and 675 m$\mu$. |
| Zirconium acetylacetonate | Green | 620 (strong). |

A green color was produced in a similar manner with the following compounds: magnesium oxide, magnesium hydroxide, calcium hydroxide, and plumbous oxide.

Example II

Example I was repeated replacing magnesium acetate tetrahydrate with 0.2 g. of one of the salts listed below. Potassium acetate, 0.2 g., was added to the mixture. On irradiation a green or blue-green color was produced.

Salt:
  zinc chloride hydrate
  zinc nitrate hexahydrate
  zinc bromide hydrate
  4-diazo-N,N-dimethylaniline·zinc chloride
  magnesium chloride hexahydrate
  magnesium nitrate hexahydrate
  magnesium bromide hexahydrate
  nickelous chloride hexahydrate
  nickelous nitrate hexahydrate
  cobaltous chloride hexahydrate
  cobaltous nitrate hexahydrate
  zirconyl nitrate dihydrate
  stannic chloride pentahydrate
  manganous chloride tetrahydrate
  manganous nitrate hexahydrate
  europium chloride
  europium nitrate
  cadmium nitrate tetrahydrate
  calcium nitrate tetrahydrate
  cerous nitrate hexahydrate
  chromic nitrate nonohydrate
  yttrium nitrate
  aluminum nitrate nonahydrate
  aluminum chloride hexahydrate
  lead nitrate Example III A mixture consisting of Ethanol _____ml__ 10
9,10-phenanthrenequinone _____g__ 0.06
Zinc chloride hydrate _____g__ 0.15 was irradiated as in Example I. The resulting blue-green solution was aerated in the dark until the color was discharged. The exposure and bleach-out by air was repeated two more times and the solution was divided in half. To one portion was added 0.1 g. potassium acetate. Both solutions were again irradiated as in Example I. The acetate containing solution formed the blue-green color more readily, i.e., within 2 seconds, and formed a more intense color than the solution not containing the acetate salt.

Example IV

A photosensitive mixture comprising 9,10-phenanthrenequinone _____g__ 0.05
Acetone _____ml__ 7
Polymethyl methacrylate copolymer [1] _____g__ 0.5
Magnesium acetate tetrahydrate _____g__ 0.214
Ethanol _____ml__ 2

[1] A copolymer of methyl and n-butyl methacrylate having an inherent viscosity of 0.20 as determined with a solution containing 0.25 g. polymer in 50 ml. chloroform at 20° C. using a No. 50 Cannon-Fenske Viscometer.

was irradiated for 5 seconds as described in Example I. A blue-green color was produced which became more intense by irradiating for 30 seconds. Similar results were obtained by replacing the methacrylate copolymer with any of the polymeric binders listed below.

BINDER

Polyvinyl butyral—Butvar ® B–76 (Showinigan Resins Corp.), a polymer with a weight average molecular weight of 45,000–55,000, hydroxyl content of 9–13 (expressed as percent polyvinyl alcohol), an acetate content of 0–2.5 (expressed as percent polyvinyl acetate), a butyral content of 88 (expressed as percent polyvinyl butyral).

Polyvinyl formal—Formvar® 7/70 (Shawinigan Resins Corp.), a polymer with a weight average molecular weight of 19,000–23,000, a hydroxyl content of 5–6.5 (expressed as percent polyvinyl alcohol), an acetate content of 40–50 (expressed as percent polyvinyl acetate), a formal content of 50 (expressed as percent polyvinyl formal).

Polyvinyl acetate—Gelva® V–100 (Showinigan Resin Corp.), a polymer with a weight average molecular weight of 500,000 and a viscosity of 90–110 cps. as measured with a benzene solution containing 86 g. of polymer per 1000 ml. of solution at 20° C. using an Ostwald-Cannon-Fenske Viscometer.

Cellulose acetate butyrate—EAB 272–3 (Eastman Chemical Products, Inc.) a polymer having 20.5% acetyl, 26% butyryl and a viscosity of 9–13.5 poises as determined by ASTM method D–1343–54T in the solution described as Formula A, ASTM method D–871–54T.

Example V

The following photosensitive composition was prepared:

| | |
|---|---|
| 9,10-phenanthrenequinone | g__ 0.062 |
| Acetone | ml__ 10 |
| Zinc acetylacetonate | g__ 0.043 |
| Polyvinyl formal of Example IV | g__ 1.0 |

The composition was exposed for 15 seconds using conditions described in Example I. A blue-green color was formed.

Similar results were obtained with the same weight of acetylacetonate salts of magnesium, barium, calcium, cerium$^{+3}$, nickel$^{+2}$ and cobalt$^{+2}$.

EXAMPLE VI

Example I was repeated replacing 9,10-phenanthrenequinone by one of the following substituted 9,10-phenanthrenequinones. The solutions were irradiated as described in Example I and the color changes are recorded below

| Substituted 9,10-phenanthrenequinone: | Color formed on Irradiation |
|---|---|
| 2-nitro | Blue-green. |
| 4-nitro | Do. |
| 4,5-dinitro | Grey. |
| 2,7-dinitro | Do. |
| 3-potassium sulfonate | Blue-green. |
| 2-carboxylic acid | Do. |
| 3-carboxylic acid | Do. |
| 2-diazo fluoroborate | Do. |

Example VII

A mixture consisting of

| | |
|---|---|
| Benzene | ml__ 10 |
| 9,10-phenanthrenequinone | g__ 0.06 |
| Zinc acetylacetonate | g__ 0.20 | was irradiated as described in Example I. A blue-green color was formed. The color was discharged by bubbling air through the mixture (absence of irradiation) and reappeared when the aerated solution was again irradiated. Similar results were obtained with the magnesium salt.

Example VIII

A photosensitive composition was prepared from

| | G. |
|---|---|
| 9,10-phenanthrenequinone | 0.062 |
| Zinc acetylacetonate | 0.043 |
| Polyethylene glycol diacrylate[1] | 1.0 |

[1] Prepared by esterifying polyethylene glycol having an average molecular weight of 300.

The mixture was irradiated as described for Example I. A blue-green color was formed in a few seconds and with further irradiation the color became more intense and the fluid composition solidified.

Example IX

A solution prepared from

| | |
|---|---|
| 9,10-phenanthrenequinone | g__ 0.06 |
| Ethanol | ml__ 10 |
| Plumbous 1,1,2,3,3,3-hexafluoropropane sulfonate | g__ 0.2 | was irradiated as described in Example I. A blue-green color formed within a few seconds which in the absence of light gradually faded to its original yellow color.

The present invention provides novel compositions which can undergo color changes upon exposure to radiation. The compositions may find utility for example in photochromic applications where reversibility occurs in the dark in the presence of air. These solutions, thus, could be used to filter out certain undesirable wave lengths of light. The compositions are unique in that various intense colors can be formed during irradiation, even in the presence of air, e.g., when air is bubbled through the composition. Continued exposure to air after the irradiation ceases will cause a discharge of the color. It is advantageous that color can be formed in these compositions without having to carry out the operation in a special atmosphere such as in a vacuum or in a nitrogen atmosphere. These solutions are also useful for photometric analysis of the metal ions.

The embodiments of the invention in which an exclusive property or privilege is claimed are defined as follows:

1. A photosensitive composition comprising
   (1) as a photosensitizer 9,10-phenanthrenequinone or 9,10-phenanthrenequinone substituted with one or more electronegative groups;
   (2) a hydrogen donor compound capable of reducing said photosensitizer only in its actinic radiation activated state;
   (3) at least one salt of a metal above hydrogen in the EMF series, said salt being selected from (a) salts of weak acids, (b) lead salts of strong acids or (c) salts of strong acids with salts of weak acids where there is at least one equivalent or more of said salt of a weak acid to salt of strong acid, said salt causing no more than a 10 percent change in optical density of said sensitizer at maximum absorption; and
   (4) an organic solvent.

2. A composition as in claim 1 where said metal is lead, zinc or magnesium.

3. A composition as in claim 1 where components (2) and (4) are ethanol.

4. A composition as in claim 1 where said metal salt is an acetate, nitrate or acetylacetonate.

5. A composition according to claim 1, wherein said organic solvent contains 5% to 10% by weight of water.

6. A composition according to claim 1 containing an organic polymeric film-forming binder.

7. A photosensitive element having a support and a stratum containing
   (1) as a photosensitizer 9,10-phenanthrenequinone or said compound substituted with one or more electronegative groups,
   (2) a hydrogen donor compound capable of reducing said photosensitizer only in its actinic radiation excited state, and
   (3) a salt of a metal above hydrogen in the EMF series, said salt being selected from (a) salts of weak acids, (b) salts of volatile strong acids, (c) lead salts of nonvolatile strong acids, and (d) salts of nonvolatile strong acids with salts of weak acids where there is at least one equivalent or more of salt of weak acid to salt of strong acid, said salt causing no more than a 10 percent change in optical density of said sensitizer at maximum absorption, said stratum components being in reactive association with each other.

8. An element as in claim 7 where said metal salt is a polyvalent metal salt.

9. An element as in claim 8 where said hydrogen donors are alcohols, acetals, ethers or polyethylene glycol of molecular weight 400 to 6000.

10. An element as in claim 8 where said hydrogen donor is polyvinyl formal.

11. An element as in claim 8 containing an organic polymeric film-forming binder for said stratum.

12. An element as in claim 11 containing a plasticizer.

13. An element as in claim 11 where said salt is a nitrate salt, an acetylacetonate salt or a lead salt.

14. An element as in claim 11 which contains nickel acetylacetonate.

References Cited

UNITED STATES PATENTS

| | | | |
|---|---|---|---|
| 3,046,127 | 7/1962 | Barney et al. | 96—35.1 |
| 3,218,167 | 11/1965 | Burg et al. | 96—85 |
| 3,243,444 | 3/1966 | Sweeny | 260—396 |

OTHER REFERENCES

Knox, J.C.S., vol. 105 (1914), p. 1451, Compounds of Phenanthraquinone With Metallic Salt.

NORMAN G. TORCHIN, Primary Examiner

J. L. GOODROW, Assistant Examiner

U.S. Cl. X.R.

96—35.1, 85